(12) United States Patent
Rychter et al.

(10) Patent No.: US 6,659,501 B2
(45) Date of Patent: Dec. 9, 2003

(54) TEXTILE FORMED PART HAVING PRE-DETERMINED THREE-DIMENSIONAL SHAPE

(75) Inventors: Joseph Rychter, Trunstadt (DE); Wilhelm Karl Lehmann, Wolfegg (DE)

(73) Assignee: Josef Rychter, Trunstadt (DE)

( * ) Notice: Subject to any disclaimer, the term of this patent is extended or adjusted under 35 U.S.C. 154(b) by 0 days.

(21) Appl. No.: 10/090,907

(22) Filed: Mar. 8, 2002

(65) Prior Publication Data

US 2002/0180196 A1 Dec. 5, 2002

Related U.S. Application Data (62) Division of application No. 09/723,260, filed on Nov. 27, 2000, now Pat. No. 6,454,301, which is a continuation of application No. 09/043,378, filed as application No. PCT/EP96/04150 on Sep. 23, 1996, now Pat. No. 6,183,009.

(30) Foreign Application Priority Data

Sep. 22, 1995 (DE) .......................... 195 35 184
Dec. 28, 1995 (DE) .......................... 195 48 979

(51) Int. Cl.$^7$ ............................ B60B 21/16
(52) U.S. Cl. ................. 280/743.1; 280/728.1
(58) Field of Search .................. 280/743.1, 728.1; 2/459, 115, 77; 442/286, 277; 156/248, 308.2; 264/258, 320, 322; 428/36.1, 175; 383/3, 117; 224/627

(56) References Cited

U.S. PATENT DOCUMENTS

| | | | |
|---|---|---|---|
| 3,652,359 A | 3/1972 | Decker ................. 156/224 |
| 4,010,055 A | 3/1977 | Oka et al. ............... 156/226 |
| 4,501,856 A | 2/1985 | Harpell et al. .......... 525/240 |
| 4,895,751 A | * 1/1990 | Kato et al. ............. 428/245 |
| 4,963,412 A | 10/1990 | Kokeguchi ............... 428/137 |
| 4,994,225 A | 2/1991 | Davis ..................... 264/257 |
| 5,044,663 A | 9/1991 | Seizert .................. 280/730 |
| 5,046,759 A | 9/1991 | Enniss et al. ........... 280/743 |
| 5,068,074 A | 11/1991 | De Rego ................. 274/257 |
| 5,076,874 A | 12/1991 | Weder ................... 156/212 |
| 5,076,975 A | 12/1991 | Davis .................... 262/22 |
| 5,114,180 A | 5/1992 | Kami et al. ............. 280/743 |
| 5,251,337 A | * 10/1993 | Sloot ..................... 2/243.1 |
| 5,302,432 A | 4/1994 | Shigeta et al. ......... 428/36.1 |
| 5,364,686 A | * 11/1994 | Disselbeck et al. ..... 428/174 |
| 5,454,594 A | 10/1995 | Krickl .................. 280/743.1 |
| 5,501,259 A | 3/1996 | Palm .................... 156/156 |
| 5,505,485 A | 4/1996 | Breed ................... 280/729 |
| 5,618,595 A | 4/1997 | Matsushima et al. .... 428/35.2 |
| 5,836,611 A | * 11/1998 | Palm ................... 280/743.1 |
| 5,863,068 A | 1/1999 | Breed ................... 280/743.1 |
| 6,103,047 A | * 8/2000 | Ogawa .................. 156/245 |
| 6,322,658 B1 | * 11/2001 | Byma et al. ............. 156/309.9 |

FOREIGN PATENT DOCUMENTS

| | | |
|---|---|---|
| DE | 37 44 831 C2 | 4/1987 |
| DE | 89 07 391 | 6/1989 |
| DE | 41 42 884 A1 | 12/1991 |
| DE | 43 11 867 A1 | 4/1993 |
| DE | 44 26 844 A1 | 7/1994 |
| DE | 43 14 347 | 11/1994 |
| EP | 0 489 320 A1 | 6/1992 |
| EP | 0 496 894 A1 | 8/1992 |
| GB | 2 199 281 A | 7/1988 |
| WO | WO 90/15713 | 12/1990 |

\* cited by examiner

*Primary Examiner*—Brian L. Johnson
*Assistant Examiner*—G B Klebe
(74) *Attorney, Agent, or Firm*—Roberts, Mlotkowski & Hobbes; Laurence P. Hobbes (57) ABSTRACT

An invention relates to an inflatable gas bag (10) for an occupant restraint system of a vehicle, in particular of a motor vehicle. In order to avoid the formation of creases in the inflated state, which occurs with conventional gas bags and in order to be able to employ more lightweight textile materials for the manufacture of a gas bag, the gas bag (10) consists of a multilayered textile composite material which comprises at least one layer of a textile material and one layer of a polymer material whose melting range is lower than the melting range of the textile material. The textile composite material is formed into a specified three-dimensional shape which is to develop during inflation of the gas bag (10), and the individual layers of the textile composite material are joined together in this three-dimensional shape.

9 Claims, 4 Drawing Sheets

TEXTILE FORMED PART HAVING PREDETERMINED THREE-DIMENSIONAL SHAPE

This is a divisional of application Ser. No. 09/723,260, filed Nov. 27, 2000, now U.S. Pat. No. 6,454,301 issued Sep. 24, 2002, which is a continuation of application Ser. No. 09/043,378, filed Mar. 17, 1998, now U.S. Pat. No. 6,183,009 issued Feb. 6, 2001, which is a Section 371 of PCT/EP96/04150, filed Sep. 23, 1996.

FIELD OF THE INVENTION

The invention relates to a textile formed part that is manufactured by a method comprising fusing a polymer material to a textile fabric material to form a composite which is then thermally formed in a three-dimensional shape. The textile formed part can be used in a gas bag for vehicle applications or in clothing.

Occupant restraint systems with gas bags, frequently also referred to as airbags, which are automatically inflated in the case of a serious accident are nowadays installed in a plurality of passenger cars both on the driver's side and on the passenger's side in order to possibly avoid, in the case of a serious frontal impact of the vehicle, potential head and chest injuries of the vehicle occupants which are seated in the front. Such systems which essentially consist of a mostly pyrotechnical gas generator and a gas bag as well as of the associated control electronics are increasingly employed in the lateral area of passenger cars in order to dampen and distribute the forces acting upon the vehicle in the case of a side impact over a larger area and thus decrease the injury hazard for the vehicle occupant who is seated on the impact side. Such laterally arranged impact protection systems with gas bag, which are also referred to as sidebags, are, for example, accommodated in the vehicle doors or in the backrests.

On the basis of the predominantly positive experience gained with such impact protection systems which comprise a gas bag the trend exists to employ such systems on a wider scale in trucks and buses as well.

Depending on the task which an occupant restraint system of the initially mentioned type is to fulfill, the gas bag in its inflated state must have a precisely defined shape in order to achieve the optimum effect. The so-called driver airbags in their inflated state are, for example, approximately balloon-shaped, while the so-called passenger airbags in their inflated state are approximately cushion-shaped. Side airbags, in turn, frequently still have intricate shapes in order to be able to comply with the requirements imposed on them.

In addition, gas bags must fulfill two contradictory requirements: On the one hand they must be inflatable as rapidly as possible when required; on the other hand they have to provide as large a distance as possible between the vehicle occupant to be protected and the object with which the vehicle occupant must not collide. While the first requirement calls for a small gas bag volume, a relatively large gas bag volume is the result of the second requirement. The existence of impact protection systems with a gas bag, however, is only justified if their protective effect is as good as possible so that nowadays large gas bag volumes are preferred in order to achieve an optimum protective effect.

Conventional gas bags consist of two or more individual textile parts which are cut from textile flat material and subsequently sewn together. Accordingly, two circularly made-up two-dimensional textile parts are generally sewn together for a driver's airbag. Upon inflating these conventionally manufactured gas bags into their three-dimensional state which they must assume in order to achieve the desired protective effect, creases occur in particular in the seam area, which extend perpendicular to the seams. These creases result in high stress peaks in the seam area which is already weakened by the seam. In order to avoid bursting of the gas bag in the seam area under load, very heavy fabrics are used in the manufacture of the gas bag. These heavy fabrics in conjunction with the relatively large gas bag volume selected for achieving a good protective effect result in conventional gas bags being relatively heavy. In order to nevertheless ensure the rapid inflation when necessary, larger gas generators have to be employed which are capable of correspondingly rapidly accelerating the relatively large mass of the gas bag. Large pyrotechnical gas generators in turn are disadvantageous in that during inflation the temperature of the gas developed by the gas generator reaches very high values and that these high temperatures can affect the gas bag and destroy its fabric. In addition, a gas bag with a larger mass unfolds only later due to its higher inertia so that the hot gases developed by the gas generator act longer on the still folded fabric which is located near the gas generator. In order to not destroy the gas bag fabric as a result of this bombardment with the combustion gases great yarn thicknesses (approx. 250 to 700 dtex) are employed which ensure that the fabric does not fail even then when glowing particles impinge on the fabric and individual threads start melting.

SUMMARY OF THE INVENTION

The relatively large mass of conventional gas bags must, of course, not only be accelerated but also stopped again at the end of the inflation process. In this case, too, great loads occur in particular in the rear area which must be compensated by correspondingly reinforced seams or by multiple seams. These measures again result in an increase in the gas bag weight.

The conventionally used heavy fabrics not only have dynamic disadvantages but; in addition, enforce a relatively large packing volume due to the fact that they are also mostly relatively rigid. The seam areas are naturally particularly rigid and can therefore cause undesired injuries such as, for example, skin grazes of the occupant to be protected if the occupant assumes a so-called cut-of-position attitude while the gas bag unfolds. Any attitude which does not correspond to the optimum position relative to the gas bag is technically termed "out-of-position", for example an occupant who is seated too close to the gas bag or lateral to it. In such out-of-position attitudes the risk to be fully hit by a rigid seam area is particularly high.

In order to fulfill its protective function the gas bag must comply with two additional and also contradictory requirements: As already mentioned it must be inflatable as rapidly as possible. This requirement can generally be met only with a very tight gas bag because only then will it be ensured that the gas developed by the gas generator is completely used for inflating. On the other hand, the gas bag in the inflated state must dampen the impact of an occupant of the vehicle. To this end the gas bag must allow a defined venting of its gas filling because otherwise the colliding occupant would bounce back. Therefore, in the side facing away from the vehicle occupant, conventional gas bags are provided with openings which can have a diameter of up to 50 mm. These openings are also referred to as "vents". Because these openings are not closed during inflation, a considerable portion of the gas developed by the gas generator escapes so that the gas generator must have a correspondingly more powerful, i.e. larger, design in order to be able to reliably inflate the gas bag. Large gas generators, however, result in the above already explained thermal stresses of the gas bag fabric.

Finally, the conventionally employed heavy fabrics are not particularly tight because of the relatively great yarn thick nesses used so that these fabrics must generally be additionally coated in order to obtain the required tightness. The coatings, however, often have the problem of a poor ageing stability so that the satisfactory function of the gas bag might possibly no longer be ensured after many years.

Although known impact protection systems with gas bags decisively improve the occupants' safety, thus justifying their increasingly large-scale use, these systems still have quite a number of drawbacks which prevent an even better protective effect and moreover increase the manufacturing costs of conventional systems.

The invention is based on the object to improve conventional impact protection systems with gas bags in such a manner that with an increased protective effect as any of the above mentioned problems as possible are solved.

According to the invention this object is solved by an inflatable gas bag for an occupant restraint system, which consists of a multilayered textile composite material which comprises at least one layer of a textile material and one layer of a polymer material whose melting range is lower than the melting range of the textile material, with the textile composite material being formed into a predetermined three-dimensional shape which is to develop during inflation of the gas bag and the individual layers of the textile composite material have been joined together only in the three-dimensional shape of the gas bag.

The gas bag according to the invention therefore differs quite essentially from the previously known gas bags: During its manufacture it is already formed into the three-dimensional shape which it is to assume in the inflated state. The inventive gas bag is heat set in this three-dimensions shape by means of thermal treatment. Contrary to conventional gas bags which are combined or sewn together, respectively, from two-dimensional flat members, the described crease formation no longer occurs during inflation of the inventive gas bag, which in conventional gas bags causes dangerous stress peaks.

Due to the fact that the inventive gas bag is formed into its three-dimensional functional state during manufacture, the strength of its material can be selected considerably lower compared to the previously employed materials because the stress distribution in the gas bag material of a gas bag according to the invention is much more uniform. According to the invention considerably more lightweight textiles can thus be employed as gas bag material. In addition to the previously described advantage of a more uniform stress distribution, forming the inventive gas bag into its three-dimensional functional state during manufacture also makes it possible to reduce the gas bag volume as compared to conventional gas bags having the same protective effect because a gas bag according to the invention can, for example, be preformed into an egg-shaped configuration and in this manner bridge the same distance for which a ball-shaped gas bag with a correspondingly larger volume is conventionally required.

The inventive use of a multilayered textile composite material results in further advantages; The now employable textile materials of lighter weight need no longer be coated but rather obtain their tightness by means of the layer of polymer material which is but joined with the layer(s) of textile material in the desired three-dimensional shape of the gas bag. By means of suitable temperature control during the joining process the resulting textile composite material can also be given a defined gas permeability which can even be adjusted so as to be locally different. For example, on the side of the gas bag facing away from the occupant areas with a higher gas permeability can be generated so that the conventional vent orifices can be dispensed with. Due to the omission of the conventional vent orifices, the inflation losses of the gas bag according to the invention are, on the one hand, much smaller so that the use of a smaller gas generator becomes possible and, on the other hand, the weight of the gas bag is again reduced because the conventional vent orifices are seamed by one or several seams for stability reasons.

Furthermore the inflation dynamics of the gas bag according to the invention can be influenced by a locally different adjustment of the permeability of the textile composite material, i.e. the shape can be precisely controlled during inflation. Thereby, for example, the previously occurring and undesired "mushrooming" (mushroom-type ejection of the gas bag in the initial phase of the inflation process) can be prevented. Restraining straps within the gas bag as were previously employed to prevent "mushrooming" can be dispensed with in the inventive gas bag, which again makes same more lightweight. The precisely definable permeability of the textile composite material employed according to the invention additionally permits a controlled venting of the inflated gas bag and thus a nearly linear damping of the motion of the colliding occupant. In other words, the inventive gas bag can be imparted an accurately defined deformation energy absorption.

In summary, the inventive gas bag even in its simplest configuration offers the following advantages:

While the previously used gas bag fabrics, e.g. for a gas bag on the driver's side, have masses per unit area ranging from approx. 180 $g/m^2$ to 220 $g/m^2$, the multilayered textile composite material used according to the invention in the molded state has a 30 to 50 percent lower mass per unit area.

While the previously used gas bag fabrics have tensile strengths ranging from approx. 1,800 to 2,200 N/5 cm (to DIN 53875, Part 1) the multilayered textile composite material of the inventive gas bag is required to have only approx. 25 to 50 percent of this tensile strength.

While the previously employed yarn thicknesses amount to approx. 250 to 700 dtex the yarn thicknesses of the textile material employed for the inventive gas bag may range from approx. 20 to approx. 40 dtex.

The gas bag according to the invention can be brought into any shape which is desired from the point of view of safety while at the same time minimizing its volume.

Due to its superior design the gas bag according to the invention is generally considerably more lightweight than previous gas bags and thus permits the use of smaller gas generators.

The gas bag according to the invention requires a considerably lower packing volume which, for example, allows the vehicle manufacturers to accommodate gas bags with large volumes also in smaller visually more attractive steering wheel hubs as are generally used in sports steering wheels.

According to a preferred configuration in terms of manufacture and function the inventive gas bag consists of several portions each of which is formed into one part each of the three-dimensional shape of the gas bag and which are joined together in the three-dimensional shape of the gas bag, in particular by lap sealing. According to this configuration a gas bag intended for the driver's side is preferably formed by combining two e.g. approximately hemispherical portions. Such a configuration permits the use of a textile material for the side of the gas bag facing the occupant which is different from that facing away from the occupant so that an optimum adaptation of the textile material to different requirements can be effected. In order to join the individual partial portions, all known joining techniques (with or without an inserted auxiliary tape) can generally be used. The individual portions can also be glued or sewn together. The latter type of joining, however, is the one considered the least advantageous.

The layer of a polymer material provided according to the invention can be constituted by a plastic film or by a plastic fleece. The layer of polymer material itself can consist of several layers, for example, of two thin layers of a melting adhesive between which a plastic film is arranged. The layers of melting adhesive can, in turn, be formed by thin fleeces (so-called hotmelt fleece). With a multilayered structure of this type of the polymer material layer the joint area remains soft and flexible also after hot sealing because the central layer of the polymer material need not be heated to the flow condition. Instead, only the thin melting adhesive layers are heated to the flow condition and provide for the desired intimate interconnection of the textile composite material.

According to a particularly preferred embodiment of the inventive gas bag the textile composite material comprises at least two layers of textile material between which the layer of polymer material is arranged. This embodiment makes it possible to select the textile material on the gas bag inner surface different from the textile material on the gas bag outer surface and, thus, to better adapt it to the different requirements (inner surface temperature resistance, outer surface softness, etc.). In addition, this embodiment also makes it possible to make the properties of the inventive textile composite material more isotropic by joining together the two layers of textile material with an opposite twist at a defined angle in order to compensate, for example, the biaxial elongation differences. It goes without saying that also three or more layers of textile material can be used in order to achieve an even better isotropy. One layer of polymer material always arranged between two layers each of textile material. In order to achieve a better isotropy the individual layers of textile material need not consist of different materials, but may, of course, consist of the same textile material.

In the case of the inventive gas bag, a knitted fabric, a warp-knitted fabric, or a woven fabric can be used. Preferably, however, knitted fabrics, i.e. warp-knitted or knitted fabrics, are used because with knitted fabrics a very good isotropy can be achieved in the three-dimensional functional state of the gas bag, even in the case of only a few textile layers. Woven fabrics, however, always have a warp and weft direction so that a high isotropy is difficult to obtain.

In order to facilitate recycling of the gas bag according to the invention, the layers of textile material and the polymer material preferably consist of the same material, for example, of polyamide or of polyester.

The initially mentioned problems of conventional impact protection systems with gas bags are also solved by an inventive method for the manufacture of an inflatable gas bag, wherein a layered structure of at least one layer of textile material and one layer of polymer material whose melting range is lower than the melting range of the textile material is brought into the desired three-dimensional shape which develops on inflation of the gas bag or a portion of said shape by means of heated forming tools and is thermally set in this state and simultaneously laminated to a textile composite material. This method is particularly well suited for the manufacture of a previously described inventive gas bag.

In the manufacturing method according to the invention the layered structure whose layers are not yet securely joined to one another is brought into the desired three-dimensional shape which may correspond to the complete gas bag or to a portion therefrom between usually two heated forming tools and is thermally set in this state and simultaneously laminated to a textile composite material. The method according to the invention is thus a three-dimensional textile laminating and molding method. In the inventive manufacturing method for gas bags it must be ensured that no excessive compacting pressure is generated between the forming tools so that the generating textile composite material maintains its textile properties as far as possible.

The thermal setting of the obtained three-dimensional shape is effected by selecting the temperature of the forming tools such that the textile material does not begin to melt or is damaged but is thermally set in the desired three-dimensional shape. If required, thermal setting can be assisted by chemical auxiliary agents and/or mechanical rubbing movements of the forming tools. Due to the laminate generated in this manner the textile composite material of the gas bag according to the invention has an extremely high strength with a low weight. The mass per unit area of the employed textile composite material in the three-dimensional functional state preferably ranges from approx. 100 g/m$^2$ to approx. 150 g/m$^2$.

According to the invention, melting starts only with the layer of polymer material in order to achieve an intimate connection with the textile layer or the textile layers. The commencement of melting of the polymer layer can be controlled in such a manner that, at the same time, the permeability of the generating textile composite material is accurately adjusted. The temperature can thereby be controlled in a locally different manner so that locally different gas permeabilities can be obtained. In addition to or as an alternative to the possibility of adjusting the gas permeability of the gas bag by means of controlling the temperature in the inventive manufacturing method, it is also possible to perform a specific mechanical perforation of the layered structure or the generating textile composite material, e.g. by means of a forming tool provided with needles, during the forming, heat setting and laminating process.

If the gas bag is to be combined from several portions, these individual portions are joined together in the manufacturing method according to the invention in the desired three-dimensional shape, preferably by means of lap sealing. Compared to the previously used sewing technique which yields a maximum of 50 to 60 percent of the fabric strength in the seam areas; at least almost the strength of the remaining textile composite material is achieved also in the joint areas by means of lap sealing. This leads to a significant weight saving for a gas bag which is manufactured in accordance with the inventive method. In addition, the edges of the individual portions of the gas bag which are manufactured in accordance with the inventive method can be exactly seamed with the seam not extending outwardly or inwardly as hitherto but being flush with the three-dimensional shape of the gas bag. Therefore, no protruding seam is generated when joining the individual portions but the joint area is also located within the enveloping surface of the gas bag. In this manner a precise lap sealing of individual portions becomes possible. In addition a joint obtained by lap sealing is stronger and more lightweight than a conventional sewn seam.

The inventive manufacturing method permits the individual textile layers to be stretched during the forming process up to an also locally defined residual elasticity. As already explained in conjunction with the above described gas bag according to the invention the inflation dynamics can thereby be precisely influenced. Moreover, stretching of the textile layers results in an increase of the tensile strength of the textile composite material.

The inventive manufacturing method can be carried out with textile materials made from all commercially available synthetic fibres but also with textile materials from natural fibres, e.g. mercerized cotton. It is of importance that the melting range of the polymer layer(s) is lower, preferably only slightly lower, than the melting range of the textile material. A number of successful test samples has already been manufactured both from polyamide and from polyester textile materials. In general, such textile materials have a melting range from approx. 210 to 240° C. The temperature to be selected in the inventive manufacturing method when using such textile materials is therefore within a range of between approx. 180 and 210° C. so that the textile material will not be damaged, the polymer material layer, however just begins to melt.

The above described gas bags with their advantageous properties can be manufactured by means of the inventive method. In spite of the generation of a multilayered textile composite material the manufacturing costs are, due to the significantly lower mass per unit area, considerably lower than the manufacturing costs for conventional gas bags which must use the heavier textile materials.

Although the just described manufacturing method has been explained above with reference to gas bags for impact protection systems, it is obvious for those skilled in the art that this manufacturing method can very advantageously be employed for other formed parts made from textile materials as well. For example, textile formed parts can be manufactured for work, sports, leisure clothing or for containers of textile materials such as rucksacks or bags. One sample application would be to make clothing shoulder sections which are to be rainproof but breathing by means of the inventive method. In this manner the hitherto seam on the shoulder which leads to tightness problems or which has to be sealed separately with a considerable amount of effort can be omitted. The method according to the invention is therefore particularly suited for the manufacture of formed textile parts which are to be permeable for water vapour in one direction in order to be able to emit the water vapour which is generated when sweating during heavy physical labour and waterproof in the other direction in order to provide, for example, a protection against rain.

BRIEF DESCRIPTION OF THE DRAWINGS

The invention will be explained in the following with reference to schematic drawings of a preferred embodiment of an inventive gas bag, in which.

DETAILED DESCRIPTION OF THE INVENTION

Figure 1:
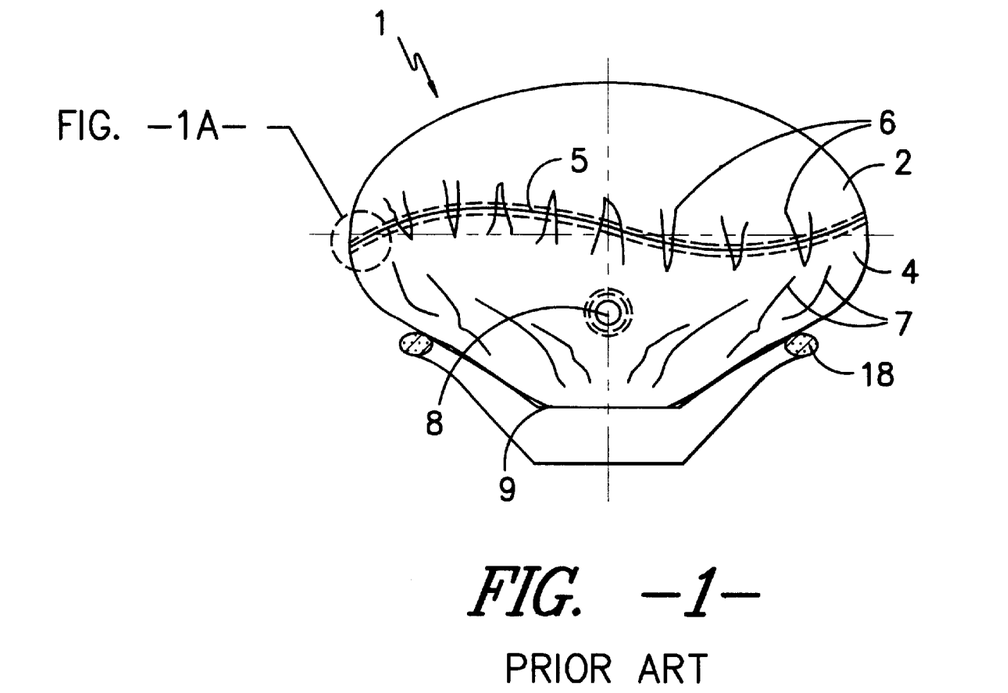
FIG. 1 shows a conventional gas bag for an impact protection system in a vehicle.
Figure 1A:
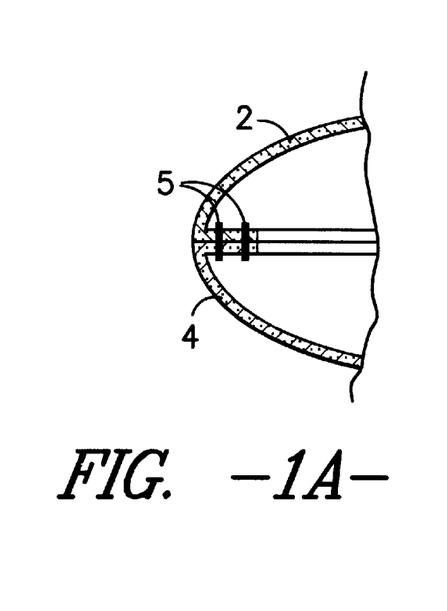
Figure 1B:
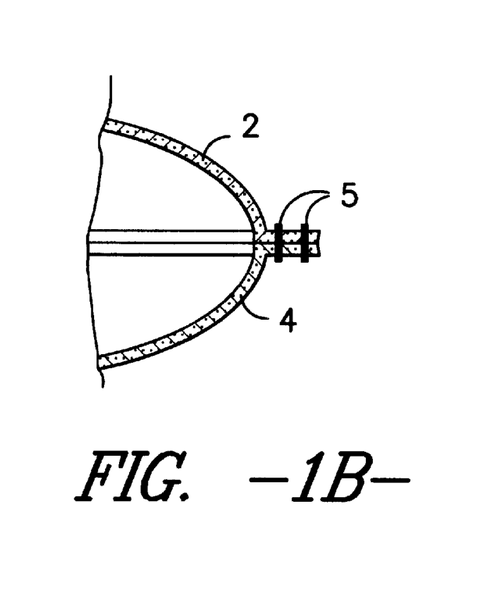

FIG. 1 shows a conventionally manufactured gas bag 1 of an impact protection system known from the state of the art which is arranged on the driver's side in a motor vehicle, also referred to as a driver airbag. The gas bag 1 consists of an upper half 2 which faces towards the driver and a lower half 4 which faces away from the driver. The two halves 2, 4 are joined together by means of a sewn seam 5 which in the illustrated example is constructed as a double seam. The sewn seam 5 forms a seam which projects essentially at right angle from the gas bag 1 and which according to the detail drawings 1a and 2a either projects into the interior of the gas bag 1 or outwardly from the gas bag 1. Both halves 2, 4 are made-up of circular disk-shaped textile parts of flat textile material.

From FIG. 1 which shows the gas bag 1 in the inflated state it can clearly be seen that the deformation which occurs during the inflation process of the flat textile parts which constitute the two halves 2 and 4 into the three-dimensional state a plurality of creases 6 is generated in the joint area of the two halves 2 and 4 as well as creases 7 which extend from the connecting cone of the gas bag 1 over its lower half 4. The creases 6 extend essentially perpendicularly to the sewn seam 5 and, like the creases 7, result in undesired stress peaks in the gas bag fabric.

In the lower half 4 of the gas bag 1 an orifice or opening 8 can also be seen through which the gas can be vented upon impact of the vehicle occupant on the gas bag 1. If required, several of such openings 8 are provided. Due to the fact that these openings 8 are not closed during inflation of the gas bag 1 a considerable amount of the filling gas which is actually intended for inflation of the gas bag is already vented during the inflation process.

The gas bag 1 shown in FIG. 1 is attached to a gas generator (not shown herein) which is accommodated in the hub of a steering wheel 9.

Figure 2:
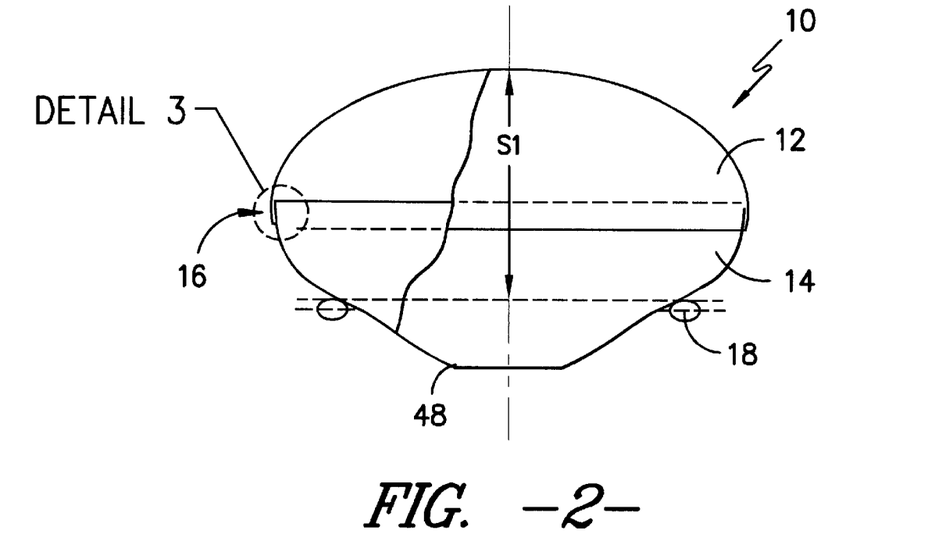
FIG. 2 shows a gas bag joined from two portions, which is manufactured according to the invention.

FIG. 2 shows a gas bag 10 according to the invention in the inflated state. Contrary to the just described conventional gas bag, two halves 12 and 14 of the inventive gas bag is shown in FIG. 1 have been formed into the desired three-dimensional shape and thermally set in this three-dimensional shape by means of the method according to the invention. Contrary to the state of the art the two halves 12 and 14 are not joined together by means of a sewn seam but by a lap seal 16. A lap seal of this type can, for example, be obtained by means of ultrasonic sealing. The lap seal 16 has a very high strength and causes only a minor material thickening in the joint area so that the previously existing injury risk due to projecting and/or rigid seams is minimized. The way of manufacturing gives the inventive gas bag 10 a shape free of creases in the inflated state. S1 identifies the functional distance which is obtained in the inflated state between an area defined by the steering wheel rim 18 and the maximum extension of the gas bag 10 in the direction towards the vehicle occupant.

Figure 3:
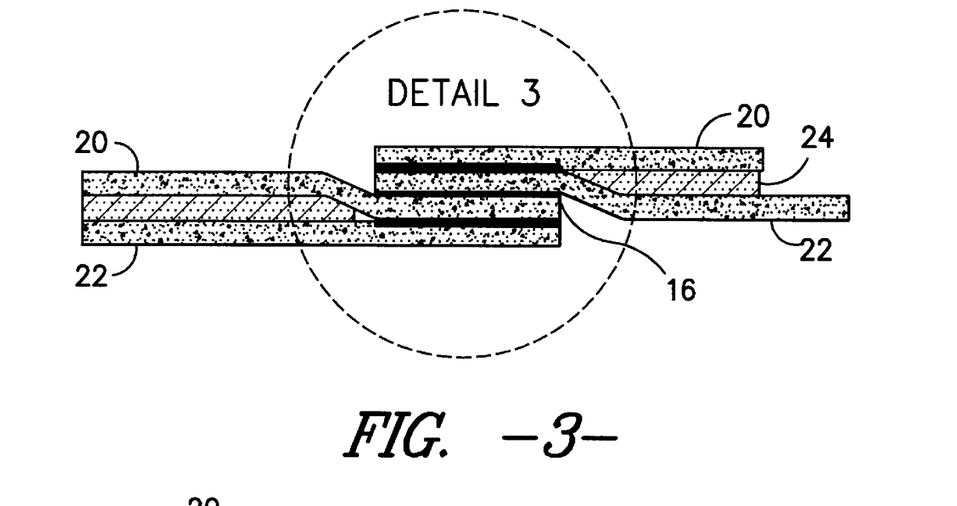
FIG. 3 shows the joint area (detail 3) between the two portions of the gas bag from FIG. 2 as a section and in an enlarged illustration.
Figure 4:
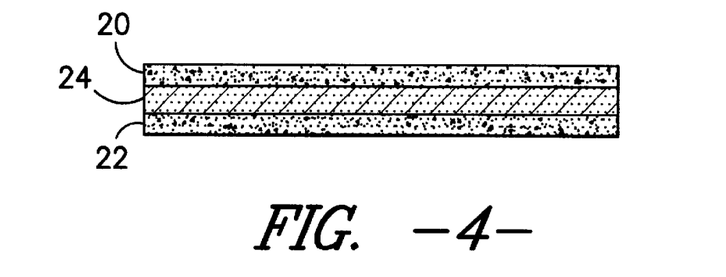
FIG. 4 shows the section through a textile composite material used according to the present invention.

FIG. 3 and FIG. 4 show in more detail the structure of the textile composite material of which the inventive gas bag 10 consists. The textile composite material of the illustrated embodiment comprises three layers and consists of two layers 20, 22 of textile material between which one layer 24 or polymer material is arranged which herein is formed as a plastic film. In the joint area of the two halves 12 and 14 of the gas bag 10 the layer 24 of polymer material is brought into a flowable condition, e.g. by means of ultrasound, so that the polymer material penetrates the layers 20 and 22 of textile material and is thus combined with the respective adjacent textile material layer of the other half 12 or 14. After cooling down of the polymer material which has been brought into the flow condition in the overlap area of the two halves 12 and 14, the two halves 12, 14 are securely joined together by means of the generated lap seal 16. Due to the fact that the thickness of the layer 24 of polymer material is reduced during heat sealing the area of the lap seal between the halves 12 and 14 is only slightly thicker than the adjacent textile composite material.

FIG. 4 again shows a section through the structure of the textile composite material. The layers 20 and 22 of textile material may differ from each other, i.e. they may consist of different textile materials.

The manufacturing of the gas bag 10 will now be described in more detail with reference to FIGS. 5 and 6. In the manufacture of the gas bag 10 an apparatus is used which may be a heated female die tool 25 and an also heated male die tool 28 (see FIG. 5). Between the two forming tools 26 and 28 a layered structure 30 is first placed which in the shown example consists of two layers 20, 22 of warp-knitted textile material and a layer 24 of polymer material in the form of a plastic film which is arranged between them. Initially, the individual layers of the layered structure 30 are not securely joined together.

In a next step the two heated forming tools 26, 28 are moved into contact with each other in order to bring the layered structure 30 into that form which the gas bag 10 or a portion of same is intended to assume later in the inflated state. FIG. 5 shows the closed condition of the two forming tools 26 and 28 with reference to an example for the manufacture of an upper half of a driver's airbag. During the closing movement of the forming tools 26 and 28 it may be useful to apply a vacuum to the female die tool 26 in order to assist the sliding in of the layered structure 30 into the forming tool 26. By maintaining the layered structure 30 under a defined counterstress during the closing movement of the two forming tools 26 and 28, the layers 20 and 22 of textile material which are arranged between the two forming tools 26 and 23 can be stretched up to a predetermined residual elongation property.

It is of importance that in the closed end position of the two forming tools 26 and 28 no excessive compaction pressure is exerted onto the layered structure 30 so that its textile properties are maintained as far as possible. Therefore, a defined gap whose gap width depends on the structure of the respective layered structure 30 is provided between the heating layers 12 and 14 of the two forming tools 26 and 28.

Figure 5:
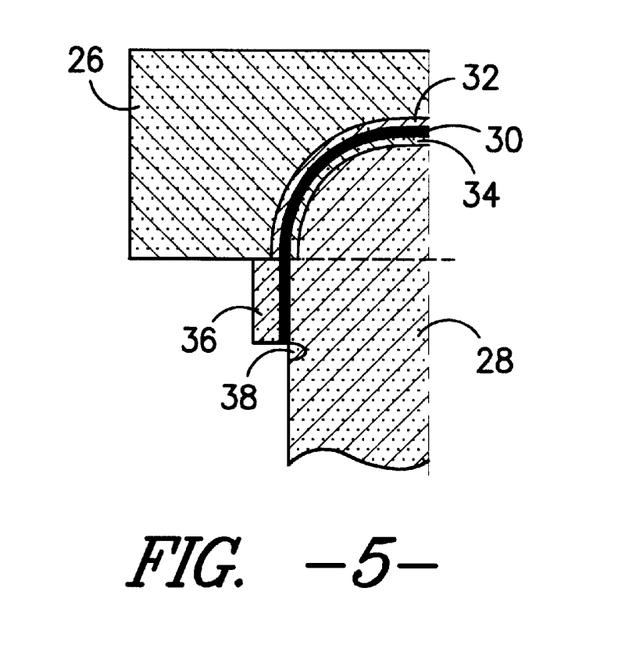
FIG. 5 shows the joining of two gas bag halves manufactured according to the invention.

In the position of the forming tools 26 and 28 as shown in FIG. 5 the layered structure 30 is simultaneously thermally set and formed into a textile composite material in the three-dimensional shape which is specified by the forming tools 26 and 28. This is achieved in that the temperature of the forming tools 26 and 28 is selected in such a manner that, on the one hand, the two layers 20 and 22 are heated only to such an extent that, in a similar manner to an ironing process, they assume the shape as specified by the forming tools 26 and 28 free of creases, and that on the other hand, however, the temperature is sufficient to just start melting the polymer intermediate layer 24 at the two layers 20 and 22 of textile material. It has proven to be advantageous to select the polymer material of the layer 24 in such a manner that its melting range is only slightly, i.e. approx. 20 to 40° C., below the melting range of the textile material.

After the described forming and heat setting process the obtained formed textile part is brought exactly into the desired dimension by means of a ring 36 which is arranged concentrically with the male die tool 28 and a circumferential groove 38 which is provided in the female die tool 26 by engaging a blade (not shown) into the circumferential groove 38 for cutting off any surplus margin. Alternatively, this exact dressing can also be carried out e.g. by means of a resistance wire embedded in the male die tool 28, which is briefly heated and thereby melts off the surplus margin. After the dressing operation the two forming tools 26 and 28 are opened again and the formed textile part, in the shown example one half of a gas bag, can be removed. The textile formed part is as soft and supple as a textile piece and can therefore be folded extraordinarily well.

Figure 6:
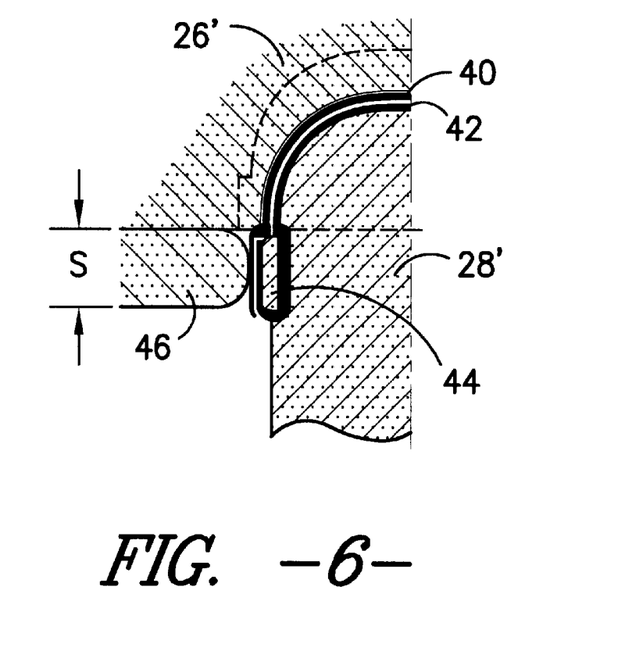
FIG. 6 shows the manufacture of a gas bag half according to the invention.

FIG. 6 shows how two separately manufactured gas bag halves are joined. For this purpose a lower gas bag half 40 is first placed into a female die tool 26' and then an upper gas bag half 42 turned to the inside is placed upon the lower gas bag half 40. An annular loose part 44 made of steel or PTFE is arranged in the joint area between the upper gas bag half 42 and the lower gas bag half 40 so that the margins of the upper gas bag half 42 and the lower gas bag half 40 overlap on the radially outer circumferential surface of this loose part 44. This is schematically indicated in FIG. 6 by a small gap between the overlapping margins.

Subsequently the two overlapping margins of the upper and lower gas bag half are heat sealed to one another, for example by means of an ultrasonic sonotrode 46 and the loose part 44 as a counter support, The two gas bag halves 40 and 42 are then joined to form the gas bag 10 and after opening of the forming tools 26', 28' only the loose part 44 has to be removed through the gas generator connecting port of the formed gas bag 10.

With the described manufacturing method gas bag halves 40 and 42 with an accurately defined gas permeability can be manufactured in that the temperature of both forming tools 26 and 28 is accurately, also locally, controlled. Alternatively or additionally, the female die tool 26 can be provided with needles which later perforate the generated textile composite material (not shown). It is therefore possible to manufacture gas bags 10 with a gas bag shape which is individually matched to a certain vehicle type and locally different gas permeabilities by means of the described manufacturing method so that the impact energy of a vehicle occupant can be optimally absorbed and dampened. In addition, the filter effect of the gas bag 10 can be adjusted without special nozzles in such a manner that both an optimum dynamic behaviour during the inflation process is achieved and the ingress of harmful gases into the area of the occupants is prevented to a large degree.

Figure 7:
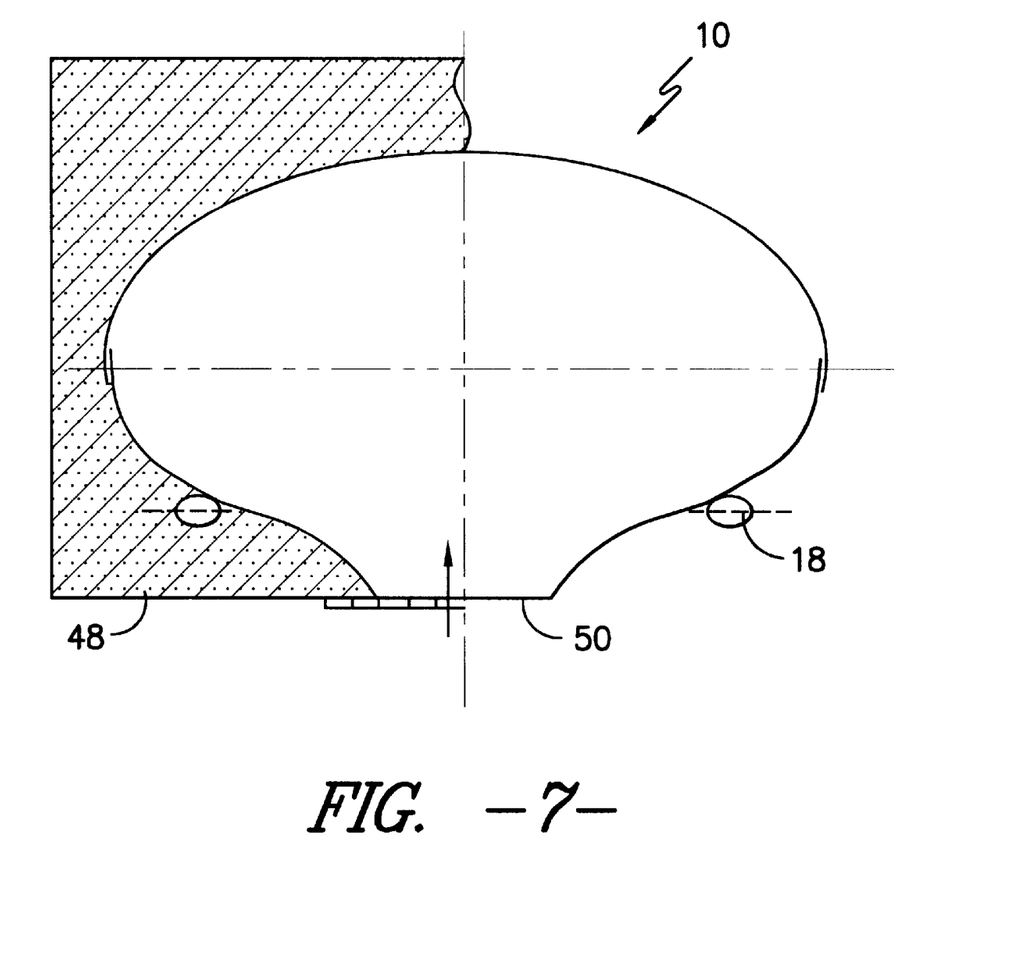
FIG. 7 shows an example of a manufacturing tool for the manufacture of a gas bag according to the invention consisting of only one part.

Finally, FIG. 7 shows a possibility of manufacturing a gas bag 10 in one part and without heat sealing joint. For this purpose the layered object is drawn or blown, respectively, into a hollow surface mould 48 and hot air is then blown throught the gas generator connecting port 50 into the gas bag 10 so that the individual layers of the layered structure fit snugly to the hollow surface of the hollow mould 48 and are thermall set there and laminated to the composite material. Cooling air is then blown in through the gas generator connecting port 50 and the completed gas bag 10 is removed.

What we claim is:

1. A textile formed part that is manufactured by a method that comprises the concurrent steps of:
   (a) fusing a fusible polymer material comprising a plastic film to at least one layer of textile fabric material, wherein the melting point of said fusible polymer material is lower than the melting point of said textile fabric material, between forming tools to form a multilayered textile composite; and
   (b) thermally forming said multilayered textile composite in a three-dimensional shape corresponding to a desired profile.

2. The textile formed part of claim 1 wherein said polymer material fused to said textile fabric material comprises a film or fleece material.

3. The textile formed part of claim 1 wherein said multilayered textile composite comprises two layers of textile fabric material between which said polymer material is disposed.

4. The textile formed part of claim 1 which is a portion of an article of clothing.

5. An article of clothing which comprises the textile formed part of claim 1.

6. The article of claim 5 wherein said textile formed part comprises a shoulder section.

7. The textile formed part of claim 1, which is a portion of a container.

8. The textile formed part of claim 7 which is a portion of a bag.

9. The textile formed part of claim 7 which is a portion of a rucksack.

* * * * *